United States Patent [19]

Suzuki et al.

[11] Patent Number: 4,733,943
[45] Date of Patent: Mar. 29, 1988

[54] PICKUP FOR OPTICAL DISC

[75] Inventors: Shinichi Suzuki; Takashi Suemitsu; Nobuyuki Kataigi, all of Yamanashi, Japan

[73] Assignee: Pioneer Electronic Corporation, Tokyo, Japan

[21] Appl. No.: 552,880

[22] Filed: Nov. 17, 1983

[30] Foreign Application Priority Data

Nov. 17, 1982 [JP] Japan .................. 57-200360
May 23, 1983 [JP] Japan .................. 58-90433

[51] Int. Cl.⁴ .................. G02B 27/44; G02B 5/18
[52] U.S. Cl. .................. 350/162.16; 350/162.2
[58] Field of Search .................. 350/162.11, 162.16, 350/162.17, 162.2, 162.22

[56] References Cited

U.S. PATENT DOCUMENTS 4,036,552 7/1977 Lee et al. .................. 350/162.16
4,295,152 10/1981 Khoe et al. .................. 357/17

OTHER PUBLICATIONS

Genovese et al., "Phase Plate Lens for a Multiple Image Lens System", IBM Tech. Disc., vol. 8, No. 12, May 1966.

Primary Examiner—John K. Corbin
Assistant Examiner—David J. Edmondson
Attorney, Agent, or Firm—Sughrue, Mion, Zinn, Macpeak, and Seas

[57] ABSTRACT

A pickup system for an optical disc reading/recording apparatus in which a micro Fresnel lens, formed with concentric circular gratings, is used in place of an optical element, such as an objective lens, for focussing and collimating light beams from a semiconductor light source. The pickup system so formed is light in weight, easily miniaturized, and inexpensive to manufacture. The micro Fresnel lens can be formed as an integral unit with the semiconductor laser by mounting the lens in a window of the case of the semiconductor laser.

6 Claims, 26 Drawing Figures

PICKUP FOR OPTICAL DISC

BACKGROUND OF THE INVENTION

Figure 1:
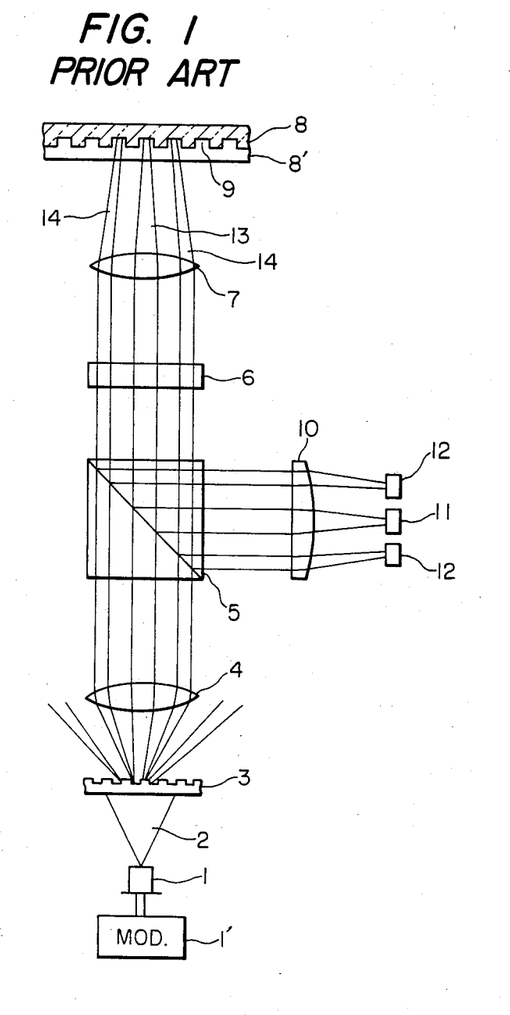
FIG. 1 shows a prior art three-beam optical pickup for an optical disc.

The present invention relates to a semiconductor laser used as a light source for an optical pickup for a video disc, a digital video audio disc (DAD), a writable, readable and erasable optical disc, and the like. As shown in FIG. 1, a three-beam pickup has been heretofore proposed for use in optical systems of the types described. In the drawing, reference numerals 1, 3 and 4 designate, respectively, a semiconductor laser, a diffraction grid for diffracting a laser beam 2, and a collimating lens for converting the diffracted laser beam into a parallel light flux. Reference numerals 5, 6 and 7 denote a polarized prism type beam splitter, a quarter-wave plate for rotating the polarization axis of the laser beam through an angle of 90 degrees, and an objective lens for focussing the laser beam on a surface of the optical disc 8 coated with a film 8'. In recording is to be effected, a modulator 1' should be provided to modulate the output from the laser 1.

A cylindrical lens focusses a return beam which is separated from the laser beam 2 by the polarized prism-type beam splitter 5, onto laser beam receptive elements 11 and 12.

Figure 3:
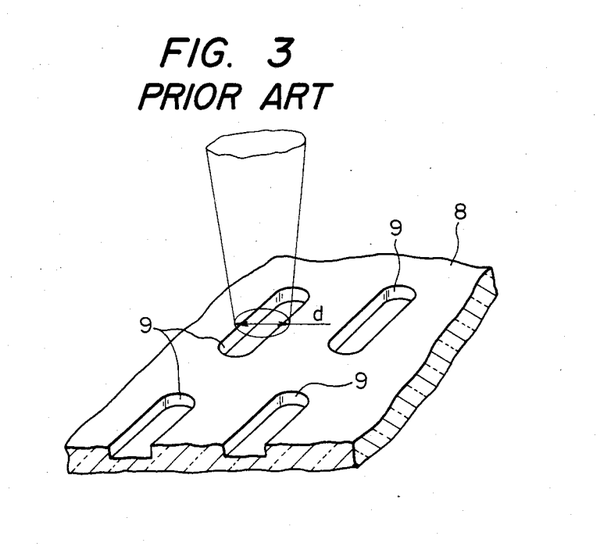
FIG. 3 is a perspective view showing a laser beam spot focussed on an optical disc.

As shown in FIG. 1, the laser beam 2 emitted from the semiconductor laser 1 is diffracted by the diffraction grid 3 and is then divided into three laser beams. These three beams, which include a zero-order diffraction beam 13 and positive and negative diffraction beams 14, are converted by the collimating lens 4 to parallel luminous fluxes, which then pass through the beam splitter 5. The polarization axes of the three laser beams 13 and 14 are rotated through an angle of 90 degrees by the quarter-wave plate 6, and then focussed to a specified beam diameter by the objective lens 7 on the pits 9 on the surface of the optical disc, as shown in FIG. 3. The laser beams 13 and 14 are selectively reflected from the pitted surface and reoriented through an angle of 90 degrees by the beam splitter 5 and focussed on the beam receptive elements by the cylindrical lens 10.

Figure 2:
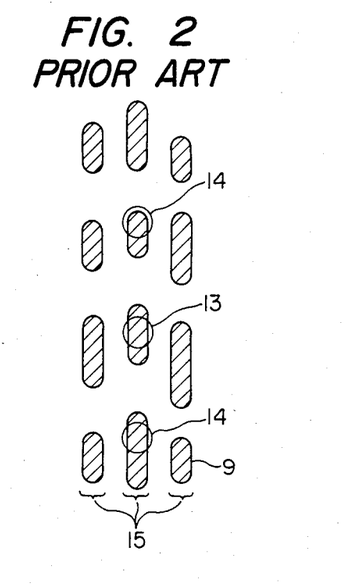
FIG. 2 is a top end view showing laser beam spots focussed on pits on the optical disc.

FIG. 2 is an end view showing the three laser beam spots focussed onto the pits 9 of the optical disc 8. The central, zero-order diffraction beam 13, the reflected portion of which is focussed on the beam receptive element 11, is used to transfer the main signal, and is also used for a servo focussing function. The positive and negative primary diffraction beams 14, the reflected portions of which are focussed on the beam receptive element 12, are directed before and behind the zero-order diffraction beam 13. These beams 14 are employed to effect a servo tracking operation whereby the zero-order diffraction beam 13 is prevented from being deflected from a track 15 of the pits 9.

In the conventional optical pickup system described above, a diffraction grid is used to divide a laser beam into three beams, whereas the collimating lens is employed for converting the three beams into parallel luminous fluxes. To this end, a relatively large space is required for the diffraction grid and the collimating lens, thus making the overall optical system long and the size of the pickup large.

Further, another disadvantage in the prior art approach is that the required diffraction grid and the collimating lens are expensive components.

For recording onto a disc, with further reference to FIG. 3, the pits 9 formed on the surface of the optical disc typically have a width of 0.5 $\mu$m, a length of 0.9 to 3.3 $\mu$m, and a track pitch of 1.1 $\mu$m. The spot diameter d of the laser focussed in the aforementioned manner on a pit 9 may be expressed by $d \propto \lambda/\text{N.A.}$, where the wavelength of the beam and the aperture number of the lens are $\lambda$ and N.A., respectively.

From the aforementioned equation it can be seen that, in order to reduce the spot diameter d of the laser beam, it is necessary to reduce the wavelength $\lambda$ or increase the aperture number N.A.

If it is desired to increase the pit density, the spot diameter d must of course be reduced. This is made difficult, however, due to the critical short wavelength of GaAs semiconductor lasers, about 7400 Å. Hence, an entirely new type of semiconductor laser would be required. Moreover, increasing the aperture number above 0.5 gives rise to a problem of aberration and renders the design of the associated lenses difficult.

SUMMARY OF THE INVENTION

The present invention remedies the aforementioned shortcomings inherent in the prior art by providing a semiconductor laser which uses, for dividing the laser beam into three beams and for converting the three beams to parallel luminous fluxes, a micro Fresnel lens formed of concentric circular gratings serving as a packgage window element. (The term "Fresnel lens," as used througbout the specification and claims, is to be understood to mean a Fresnel phase plate lens.)

BRIEF DESCRIPTION OF THE PREFERRED EMBODIMENTS

The invention will now be described with reference to an example where three pickups are employed.

Figure 4:
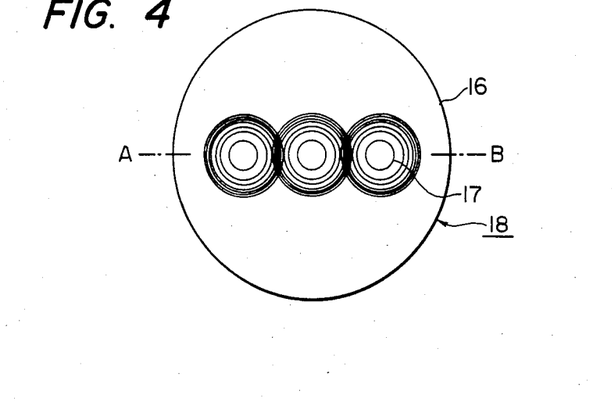
FIG. 4 is a top end view showing a micro Fresnel lens according to the present invention.

As shown in FIG. 4, a micro Fresnel lens is formed from three concentric circular gratings arranged next to each other. The micro Fresnel lens can have a rectangular cross section as shown in FIG. 5A, or a triangular cross sectio as shown in FIG. 5B.

In more detail, reference numeral 16 indicates a transparent body, made of glass or plastics, etched using photoresist techniques, for instance, to form concentric circular grating bands, the respective widths of which increase from the circumference center. Typically, each grating is composed of several hundred bands with a pitch of one to several $\mu$m and with an overall diameter of several hundred microns to one millimeter.

Figure 5A:
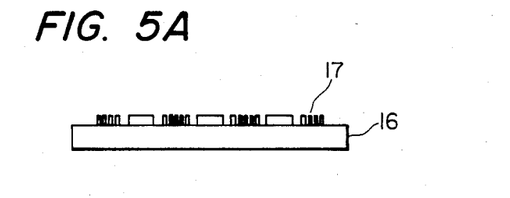
FIGS. 5A and 5B are cross-sectional views showing embodiments of concentric circular greetings of a micro Fresnel lens, taken a long line A-B in FIG. 4.
Figures 5B, 6:
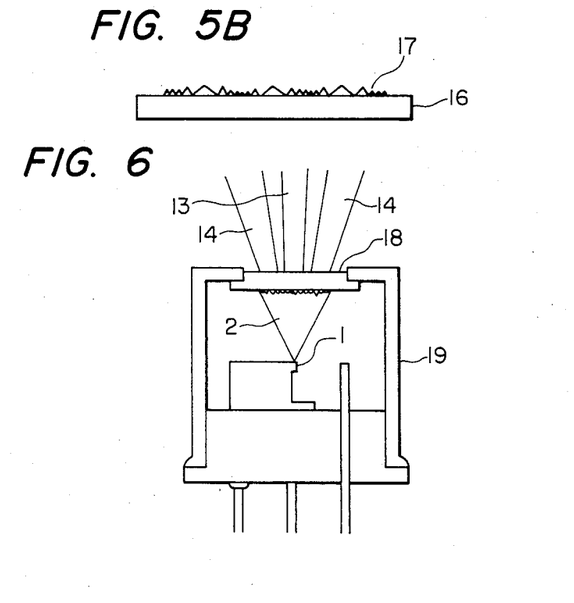
FIGS. 6 and 7 show, respectively, semiconductor lasers according to the invention and a three-beam optical pickup system using this semiconductor laser.
Figure 7:
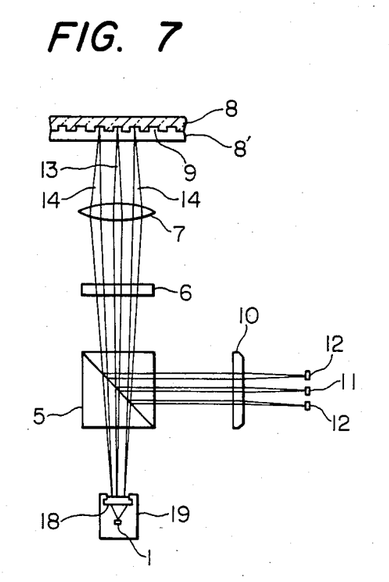
Figure 8:
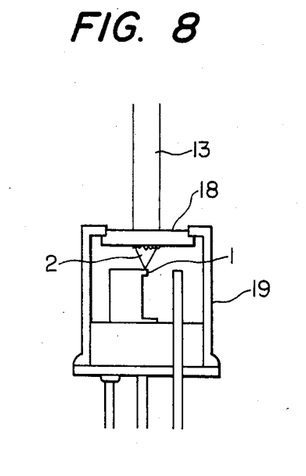
FIG. 8 shows a single beam semiconductor laser constructed in accordance with the invention.

FIG. 6 shows one form of a semiconductor laser of the invention wherein a micro Fresnel lens having three circular gratings is mounted in a window of the package of the laser. FIG. 7 illustrates a three-beam optical system for an optical disc in which the semiconductor laser described above is used as a light source. FIG. 8 shows a semiconductor laser in which the micro Fresnel lens composed of a single circular grating is mounted in a window of a package 19.

The operation of the invention will be apparent from the following description with reference to FIGS. 5A, 5B, and 7.

The laser beam 2 emitted from the semiconductor laser 1 in the package 19 is divided by the micro Fresnel lens 18 into three laser beams with the positive and negative primary diffraction beams 14 for the tracking servo directed before and behind the zero-order diffraction beam 13. These three beams pass through the polarizing prism type beam splitter 5 and are changed from linearly polarized to circularly polarized beams by the quarter-wave plate 6 and are focussed onto the pits 9 which are recorded on the optical disc 8. When the reflected laser beams pass through the quarter-wave plate 6 in the opposite direction, their polarization is changed back from circular to linear. The now-linearly polarized beams and 14 reflected from the pits 9 are deflected by 90 degrees by the beam splitter 5 in the polarizing direction, and then focussed by the cylindrical lens 10 onto the beam receptive elements 11 and 12.

The three laser beam spots scan the track 15 defined by the pits 9 on the optical disc 8 as shown in FIG. 2 with two spots 14. The front and rear spots performing a servo tracking function, while the center spot 13 is used for servo focussing and for detecting the main signal.

It is noted that the micro Fresnel lens may be arranged within the package window so that the grating processed portion 17 on the transparent substrate 16 is oriented according to particular characteristics of the optical pickup system. More specifically, the grating processed surface may be directed to the laser side (inwardly of the package) or the side (outwardly of the package) away from the laser.

Figure 9:
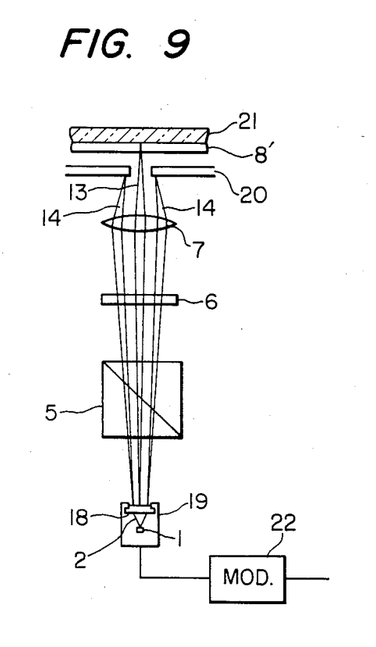
FIG. 9 is a view showing an optical system according to another embodiment of the present invention.

FIG. 8 shows an optical system which employs a single pickup beam, wherein the micro Fresnel lens 18 mounted in a window of the package 19 includes a single circular grating. A single parallel pickup beam is thereby obtained FIG. 9 illustrates another form of an optical system in which a semiconductor laser 1 with a micro fresnel lens 18 in the window of the package thereof as shown in FIG. 5 is employed as a light source for a writable, readable, and erasable optical disc 21. For writing, the two laser beams 14 which are used for the tracking servo function are shielded by a beam shutter 20 so that only the center laser beam 13 is used to effect writing on the disc 21. Writing is carried out by turning on and off the semiconductor laser 1 with a modulator 22.

Still further, the semiconductor laser according to the invention may be used as a light source for a pickup in an optical system, such as a linearly polarized optical system, which uses a half-silvered mirror without using a polarizing prism type beam splitter and quarter-wave plate.

A further embodiment of the invention will now be described with reference to FIGS. 10 through 13 wherein like reference numerals designate like or corresponding parts in FIGS. 1 through 9.

Figure 10:
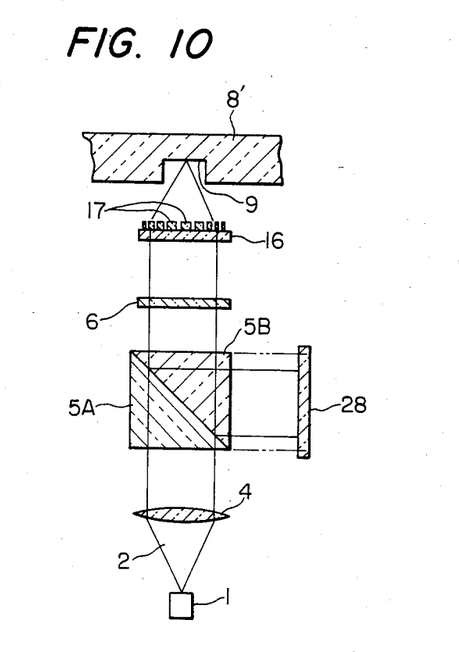
FIG. 10 shows a cross-sectional view of another embodiment of an optical pickup system for an optical disc according to the invention.
Figure 11:
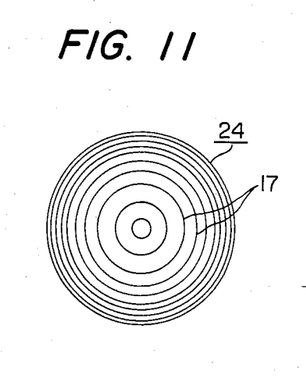
FIG. 11 is a plan view of a micro Fresnel lens used in the embodiment of FIG. 10.
Figure 12:
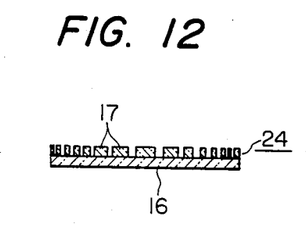
FIG. 12 is a sectional view of the lens of FIG. 11.
Figure 13:
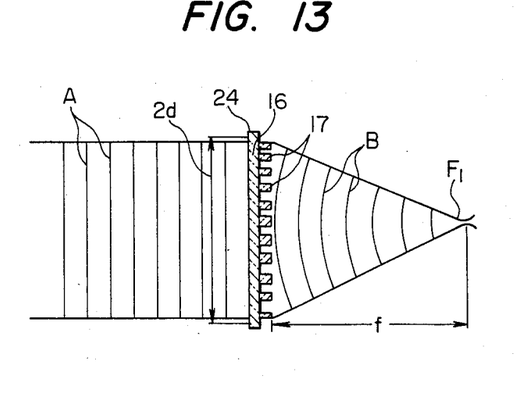
FIG. 13 is an explanatory view illustrating a condition in which a laser beam passes through a micro Fresnel lens.

In this embodiment, a micro Fresnel lens 24 is used in place of the conventional objective lens 7 of the conventional arrangement of FIG. 1. The micro Fresnel lens 24 has a grating composed of hundreds of concentric bands 17, each having a rectangular cross section, on the top of a transparent substrate 16. Laser light emitted by the semiconductor laser 1 is converted by the collimating lens 4 to a parallel light beam which is then passed through the beam splitters 5A and 5B. The polarization axis of the laser beam is rotated through an angle of 90 degrees and passed through the micro Fresnel lens 16. An incident plane polarized light wave (parallel light flux) A is thereby converted by diffraction to a spherical wave to greatly reduce the spot diameter d of the laser beam at a focal point $F_1$. In FIG. 10 et seq., reference numeral 28 indicates a beam receiving element. If the focal distance to the focal point $F_1$ of the micro Fresnel lens 24 is f and the diameter of the micro Fresnel lens 12 is 2a, the diameter of the laser spot is 2d ($\frac{1}{2}$) and 2d ($1/e^2$) for positions where the laser spot intensity is $\frac{1}{2}$ and $1/e^2$ of the center value, respectively. Accordingly, the following equations can be written:

$$2d\ (\tfrac{1}{2}) = 1.03\lambda F,$$

$$2d\ (1/e^2) = 1.64\lambda F,$$

and $$F = f/2a.$$

where F is the F number of the micro Fresnel lens 12.

It is apparent from the equations above that reducing the F number of the micro Fresnel lens results in a decrease of the spot diameter. For example, if the diameter of the micro Fresnel lens, the focal distance, and the laser wavelength are defined by $2a=0.4$ mm, $f=0.025$ mm, and $\lambda=0.6328$ $\mu$m, respectively, the respective spot diameters will be:

$$2d\ (\tfrac{1}{2}) = 0.41\ \mu m$$

and $2d\ (1/e^2) = 0.66\ \mu m.$

That is, the spot diameter of the micro Fresnel lens 16 can be reduced to less than 1 μm.

Figure 14:
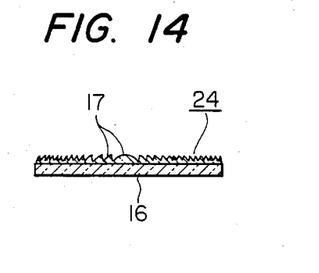
FIGS. 14 and 15 are cross-sectional views of modified micro Fresnel lens according to the invention.
Figure 15:
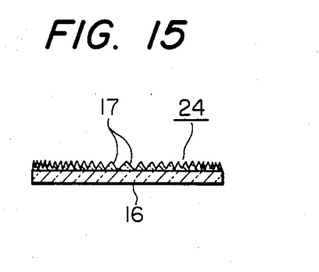
Figure 16:
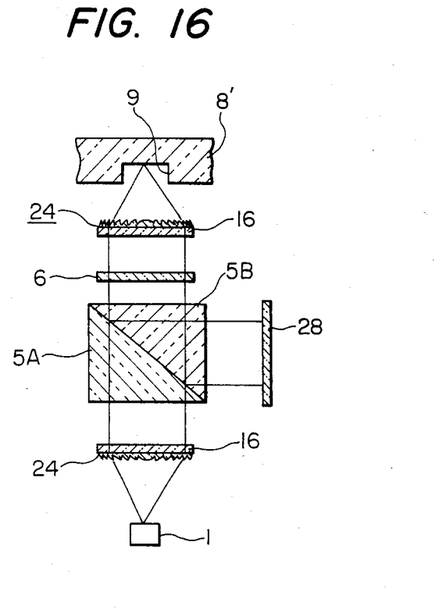
FIG. 16, 17, 18 and 19 are cross-sectional views showing still further embodiments of optical pickup systems of the invention.
Figure 17:
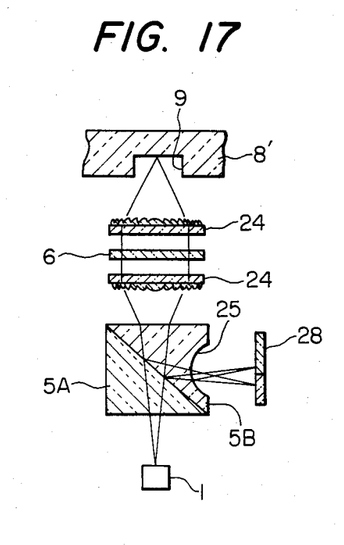
Figure 18:
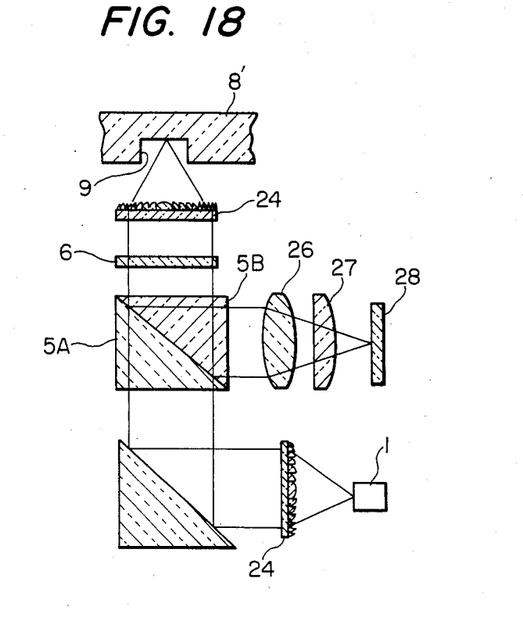
Figure 19:
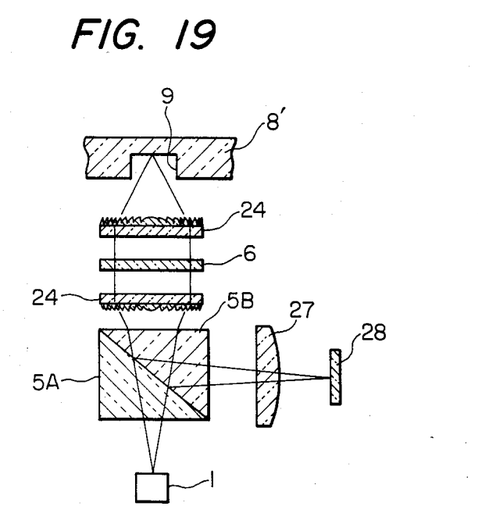

By forming the bands of each of the circular gratings with a serrated cross section as shown in FIG. 14 or a triangular cross section as shown in FIG. 15, high convergence of the laser beam will be attained due to the difference in angle of refraction between the bands of the gratings.

FIGS. 16 through 19 show further embodiments employing a micro Fresnel lens 24 instead of a collimating lens for converting the laser beam to a parallel light flux. In the embodiment shown in FIG. 17, 25 designates a cylindrical lens. Two micro Fresnel lenses 24, as illustrated, are disposed before and behind the quarter-wave plate 6. In the embodiment shown in FIG. 18, reference numerals 26 and 27 denote a condenser lens and a cylindrical lens, respectively, which are provided to improve the parallel light flux.

Figure 20:
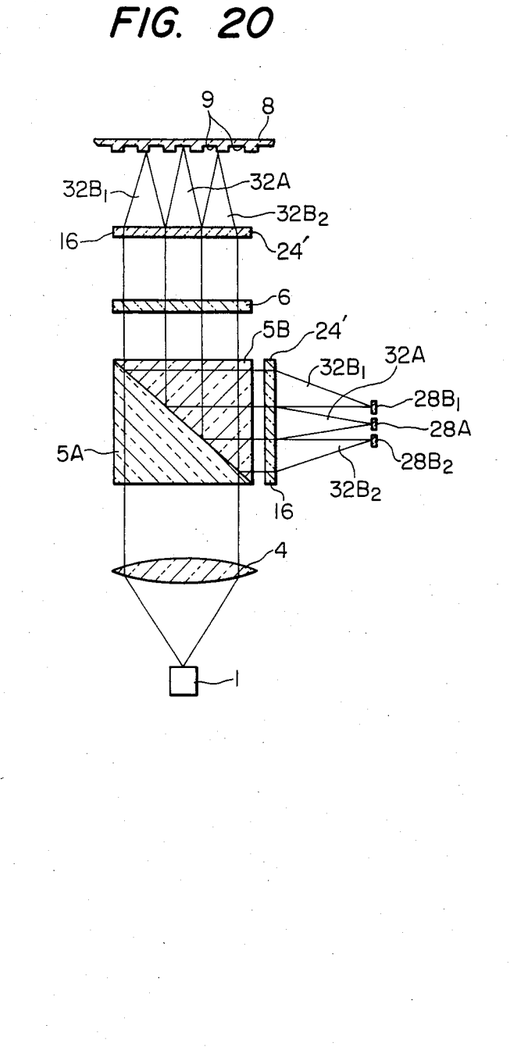
FIG. 20 is a cross-sectional view of yet another embodiment of an optical pickup system of the invention.
Figure 21:
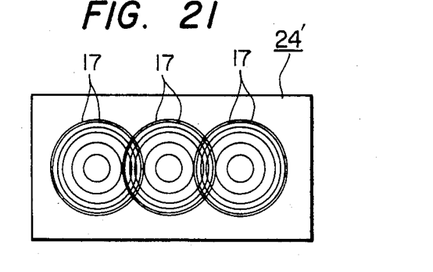
FIG. 21 is a plan view of a micro Fresnel lens used in the embodiment of FIG. 20.
Figure 22:
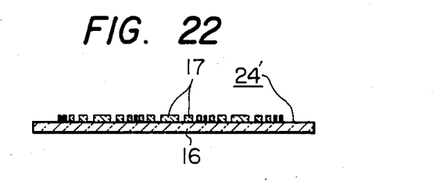
FIG. 22 is a cross-sectional view of the lens of FIG. 21.

FIG. 20 shows an embodiment related to a pickup for a three-beam type optical disc. In this embodiment, reference numeral 24' is a micro Fresnel lens array which is provided with three circular gratings, each having bands having rectangular cross sections as illustrated in FIG. 21. The micro Fresnel lens array 24' is arranged before the optical disc 8 and behind the quarter-wave plate 6.

In this embodiment, the laser beam produced by the laser 1 is converted by the collimating lens 4 to a parallel light flux, which is then passed through the beam splitters 5A and 5B. Thereafter, the axis of polarization of the laser beam is rotated by the quarter-wave plate 6 through an angle of 90 degrees, and then is separated into three separate laser beams by the micro Fresnel lens array 24', one beam serving for detecting the recorded information signal and for servo focussing and the other two for servo tracking. The light flux of the first mentioned beam, which falls between the other two beams, is converged onto the pits 9 recorded on the optical disc. The laser beams 32A, 32B$_1$, and 32B$_2$ reflected from the pits 9 are biased by the beam splitters 5A and 5B in the polarizing direction and diffracted through 90 degrees. These beams are again converged by a second micro Fresnel lens array 24' to form three beams 32A, 32B$_1$, and 32B$_2$. Among these, the laser beam 32A is focussed onto the beam receptive element 28A for servo focussing and main signal detection, whereas the other two, the front and rear laser beams 32B$_1$ and 32B$_2$, are focussed onto the beam receptive elements 28B$_1$ and 28B$_2$ for servo tracking.

Figure 23:
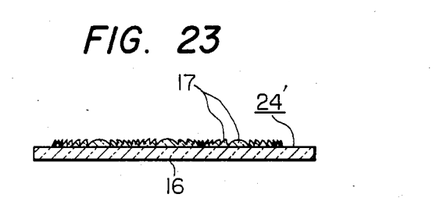
FIGS. 23 and 24 are cross-sectional views showing modified forms of a micro Fresnel lens of the invention.
Figure 24:
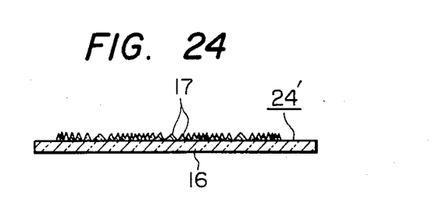

In the embodiment described immediately above, a micro Fresnel lens array 24' is used in place of the objective lens 3 to thereby improve the diffraction and convergence effects of the laser beams 32A, 32B$_1$ and 32B$_2$, thus eliminating the expensive objective lens. This also renders the pickup compact and light. Further, aberration is minimized at the wavelength of the laser beam, thus preventing an increase in aberration in an optical lens. For the micro Fresnel lens array 24', gratings having bands with a serrated cross section or triangular cross section as shown in FIGS. 23 and 24 may improve the diffraction effect.

Figure 25:
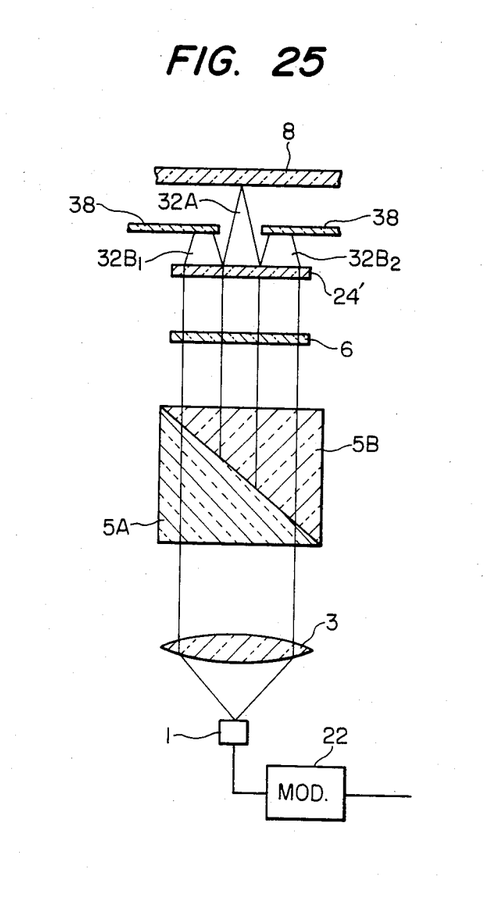
FIG. 25 is a cross-sectional view of a final embodiment of an optical pickup system of the invention.

FIG. 25 shows another embodiment of a three-beam pickup for an optical disc in which both recording and reproducing are possible. In this figure, reference numeral 38 denotes a beam shutter which is disposed between a micro Fresnel lens array 24' and the disc 8. The shutter 38 serves to selectively block the two laser beams 32B$_1$ and 32B$_2$. For writing, the two laser beams 32B$_1$ and 32B$_2$ used for servo tracking are blocked by the beam shutter 38 and only the control laser beam 32A allowed to reach the optical disc 8. In this instance, writing is effected by selectively turning on and off the laser beam with a modulator 22.

The micro Fresnel lens array 24' provided before the optical disc 8 provides diffraction and convergence effects of the laser beams 32A, 32B$_1$ and 32B$_2$, thus eliminating the need for an expensive objective lens. As a result, the pickup is rendered compact and lightweight. In addition, aberration at the wavelength of the laser is minimized, and any increase of aberration due to the presence of an optical lens is prevented.

The advantageous results of the invention described above can be summarized as follows:

(1) The micro Fresnel lens mounted in the package window functions as a diffraction grid for dividing the laser beam into three beams, and also as a collimating lens for forming the laser beam into parallel light fluxes. As a result, using the semiconductor laser structure of the invention as a light source for an optical disc pickup, the need for an expensive diffraction grid and collimating lenses is eliminated.

(2) The optical system for a pickup requires no space for a diffraction grid and collimating lens, thus rendering the pickup more compact and lighter in weight.

(3) The micro Fresnel lens can be mass produced easily using a photolithographic process.

(4) Plastics material can be used for the lens material, thereby facilitating mass production.

We claim:

1. A light source for an optical pickup comprising:
a semiconductor laser; and
a micro Fresnel lens comprising three circular gratings arranged in a linear array, portions of adjacent ones of said gratings overlapping one another, each of said gratings comprising a plurality of concentric bands, each of said bands having a rectangular cross section, a distance between said bands increasing toward a center of the respective grating, said gratings being disposed in an output light path of said semiconductor laser.

2. The light source of claim 1, further comprising a package containing said semiconductor laser, said micro Fresnel lens being mounted in a window of said package.

3. A light source for an optical pickup comprising:
a semiconductor laser; and
a micro Fresnel lens comprising three circular gratings arranged in a linear array, portions of adjacent ones of said gratings overlapping one another, each of said gratings comprising a plurality of concentric bands, each of said bands having a serrated cross section, a distance between said bands increasing toward a center of the respective grating, said gratings being disposed in an output light path of said semiconductor laser.

4. The light source of claim 3, further comprising a package containing said semiconductor laser, said micro Fresnel lens being mounted in a window of said package.

5. A light source for an optical pickup comprising:
a semiconductor laser; and
a micro Fresnel lens comprising three circular gratings arranged in a linear array, portions of adjacent ones of said gratings overlapping one another, each of said gratings comprising a plurality of concentric bands, each of said bands having a triangular cross section, a distance between said bands increasing toward a center of the respective grating, said gratings being disposed in an output light path of said semiconductor laser.

6. The light source of claim 5, further comprising a package containing said semiconductor laser, said micro Fresnel lens being mounted in a window of said package.

* * * * *